(12) United States Patent
Haggay et al.

(10) Patent No.: US 7,803,013 B2
(45) Date of Patent: Sep. 28, 2010

(54) APPARATUS AND METHOD FOR MONITORING CONNECTIVITY STATUS OF COMMUNICATION PORTS

(75) Inventors: Yaakov Haggay, Kfar Saba (IL); Pinchas Shifris, Tel Aviv (IL)

(73) Assignee: RIT Technologies Ltd., Tel-Aviv (IL)

( * ) Notice: Subject to any disclaimer, the term of this patent is extended or adjusted under 35 U.S.C. 154(b) by 1156 days.

(21) Appl. No.: 11/442,440

(22) Filed: May 30, 2006

(65) Prior Publication Data

US 2006/0271338 A1 Nov. 30, 2006

Related U.S. Application Data

(60) Provisional application No. 60/685,542, filed on May 31, 2005.

(51) Int. Cl.
*H01R 11/00* (2006.01)
(52) U.S. Cl. .................................................. 439/505
(58) Field of Classification Search ................ 439/505, 439/502, 540.1, 490, 49, 368, 371
See application file for complete search history.

(56) References Cited

U.S. PATENT DOCUMENTS

| 3,325,765 | A | * | 6/1967 | Hart et al. ................... 439/624 |
| 5,483,467 | A | | 1/1996 | Krupka et al. |
| 6,574,586 | B1 | | 6/2003 | David et al. |
| 6,684,179 | B1 | | 1/2004 | David |
| 7,021,960 | B2 | * | 4/2006 | Ubby et al. ................. 439/505 |
| 2006/0063406 | A1 | | 3/2006 | Shifris et al. |

OTHER PUBLICATIONS

International Search Report. International Application No. PCT/IL06/00637. Date of mailing Aug. 31, 2007.

* cited by examiner

*Primary Examiner*—Phuong K Dinh
(74) *Attorney, Agent, or Firm*—Pearl Cohen Zedek Latzer, LLP

(57) ABSTRACT

According to some embodiments of the invention, a connectivity apparatus is provided. The connectivity apparatus may comprise signal-terminals associated with respective sockets. These signal-terminals may form a portion of a connectivity path for transmission of scanning signals. Accordingly, the connectivity apparatus may enable central mapping of interconnections of the ports.

12 Claims, 4 Drawing Sheets

APPARATUS AND METHOD FOR MONITORING CONNECTIVITY STATUS OF COMMUNICATION PORTS

CROSS REFERENCE TO RELATED APPLICATIONS

The present invention claims benefit of U.S. provisional application No. 60/685,542, entitled "Connectivity Monitoring Device", and filed May 31, 2005.

BACKGROUND OF THE INVENTION

The need for centralized mapping of the physical connectivity of all the different components of a telecommunication network is well known. In these networks, the dynamic interconnections between communication ports located within patch panels or active devices are provided by multiconductor cables, also known as patch cords. Accordingly, monitoring and mapping the physical connectivity of the network require real-time identification of changes in the interconnections between the ports.

Some existing solutions for providing centralized mapping of the interconnectivity of ports require the use of special ports having an additional contact and a special patch cord with additional contacts and a dedicated scanning wire to enable a delivery of scanning signals indicative of the connectivity status.

Other existing systems are aimed to provide a retrofitting solution to existing standard network devices. New components which are mechanically and electronically adapted to work with conventional devices are added to the standard devices to impart the required centralized mapping of the physical connectivity to the network. The existing retrofitting solutions have several drawbacks.

Firstly, they involve attaching an adapter board or gluing a strip on an existing device. Accordingly, the device may be physically interfered as it does not remain in its original form. Additionally, the solution of retrofitting is not suitable for various devices, such as high-density switches due to spatial constrains. Furthermore, the physical characteristics of the configuration of the ports, namely, number of ports, grouping, distance between ports and the like may vary between vendors and designs. Accordingly, the retrofit kit should be tailor-made to fit the target device. This process is complex, time consuming and costly.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
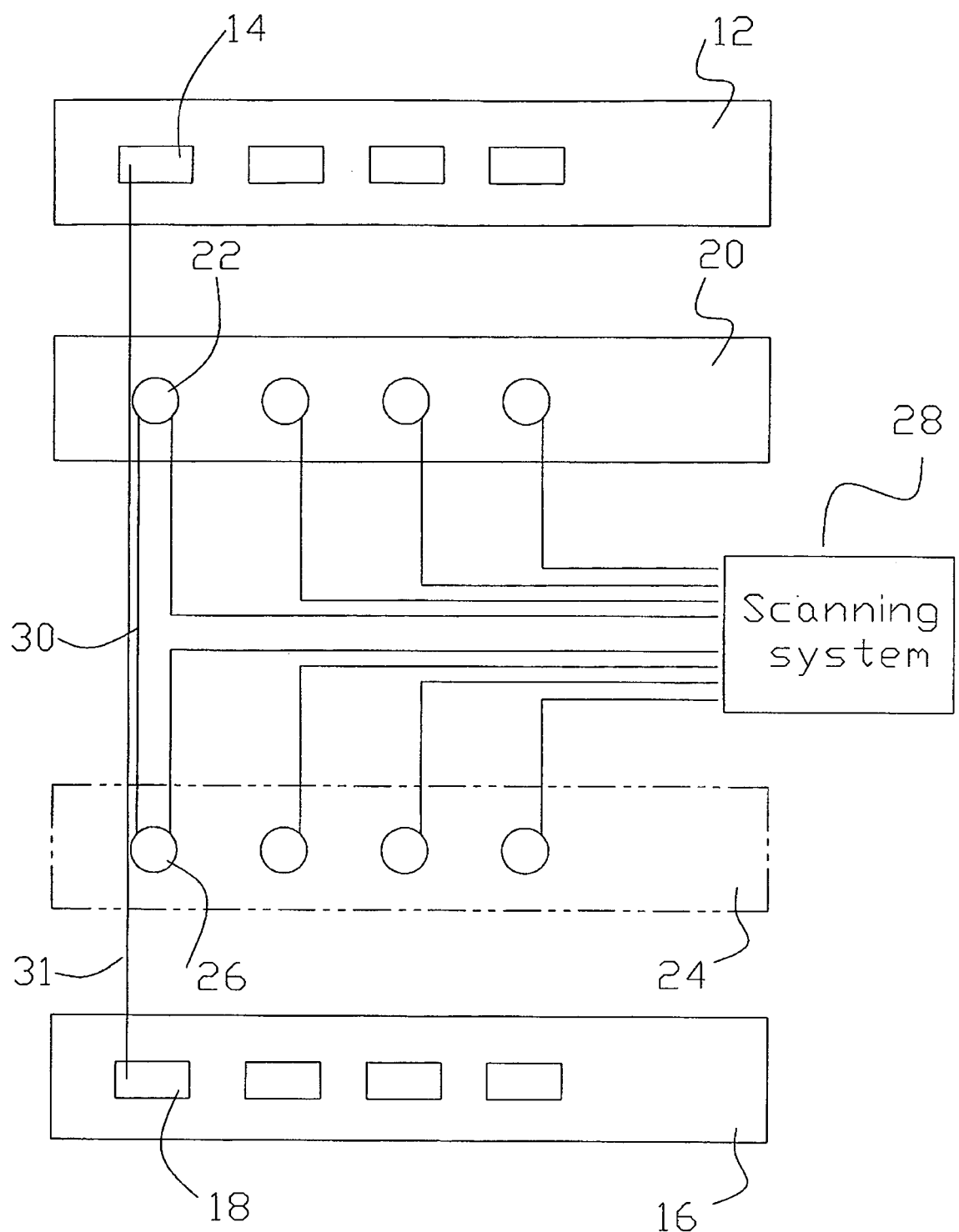
FIG. 1 is a high level diagram of a portion of a communication cabling system having a connectivity apparatus according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However it will be understood by those of ordinary skill in the art that the embodiments of present invention may be practiced without these specific details. In other instances, well-known methods, procedures and components have not been described in detail so as not to obscure the present invention.

Embodiments of the present invention are directed to a connectivity apparatus, which is an add-on device to a target device having ordinary sockets of communication ports. The connectivity apparatus may comprise signal-terminals associated with respective sockets. These signal-terminals may form a portion of a connectivity path for transmission of scanning signals. Accordingly, the connectivity apparatus may enable central mapping of interconnections of the ports.

According to some embodiments of the present invention, the connectivity apparatus may provide the cabling system the capability to determine interconnectivity of ordinary sockets without direct physical contact between the target device and the connectivity apparatus. The term "ordinary socket" refers to a socket that lacks a dedicated electrical contact for transmission and receipt of scanning signals to monitor interconnectivity of ports. A non-exhaustive list of sockets includes RJ11, RJ45, RJ12, LC, MT-RJ and others.

Reference is now made to FIG. 1, which is an exemplary illustration of a portion of a communication cabling system having a connectivity apparatus according to embodiments of the present invention. A communication cabling system 10 may include a target device 12 having a frontal surface with sockets of communication ports 14. Socket 14 may be a standard socket, such as the RJ45 socket.

Target device 12 may be communication network equipment, such as a switch, hub PABX, and others or may be a patch panel with communication ports. System 10 may include another device 16 having a frontal surface with sockets of communication ports 18. Socket 18 may be an ordinary socket similar to or different from sockets 14. Alternatively, socket 18 may be a "smart" socket. Throughout the specification and the claims the term "smart socket" refers to a socket comprising an integral scanning contact usable to determine the connectivity status of the port, directly, without the addition of a connectivity apparatus.

According to embodiments of the present invention, a connectivity apparatus 20 having signal-terminals 22 may be positioned opposite the frontal surface of target device 12 such that at least some of signal-terminals 22 are aligned with respective sockets 14. Optionally, if sockets 18 are ordinary sockets, a second connectivity apparatus 24 having scanning signal-terminals 26 may be positioned opposite the frontal surface of device 16 such that at least some of signal-terminals 26 are aligned with respective sockets 18. A connectivity apparatus according to embodiments of the present invention is described in details below with reference to FIG. 2.

Signal-terminals 22 and 26 may be electrically conductive contacts, such as for example, metal contacts. Alternatively, according to other embodiments of the present invention, signal-terminals 22 and 26 may be sensors having a self identification capability. As well known to a person skilled in the art, such sensors may be an ID-chip.

System 10 may further comprise a scanning system 28 having a plurality of transmitters (not shown), each electrically coupled to a single signal-terminal 22 for transmitting scanning signals through a connectivity path and a plurality of receivers (not shown), each electrically coupled to a single signal-terminal 22 to receive the scanning signals. Scanning System 28 may be PatchView® available from Rit Technologies Ltd. of Tel Aviv, Israel, however, it should be understood that other scanning systems may be used. Scanning system 28 may be further coupled in a similar manner to signal-terminals 26 of connectivity apparatus 24. Alternatively, if sockets 18 are smart sockets, scanning system may be coupled directly to scanning contacts (not shown) within smart sockets 18.

In order to electrically determine the connectivity status between pairs of sockets 14, 18, the connectivity solution may further comprise dedicated scanning wires 30 insertable within multiconductor cables 31 connecting the sockets. The additional scanning wire may be coupled to signal-terminal 22 and to signal-terminal 26, to complete the connectivity path of a scanning signal transmitted from scanning system 28. Accordingly, a scanning signal transmitted by scanning system 28 to a particular signal-terminal 22 may be received back at scanning system 28 via scanning wire 30 and a particular signal-terminal 26.

According to embodiments of the present invention, scanning wire 30 may be embedded within a multiconductor cable. The desired connectivity between scanning wire 30 and signal-terminals 22 and 26 may be implemented using additional signal-terminals externally attached to a multiconductor cable. A multiconductor cable having signal-terminals according to embodiments of the present invention is described in details below with respect to FIG. 3. It should be noted that the terms "multiconducor cable" and "patch cord" are used inhere interchangeably.

Figure 2:
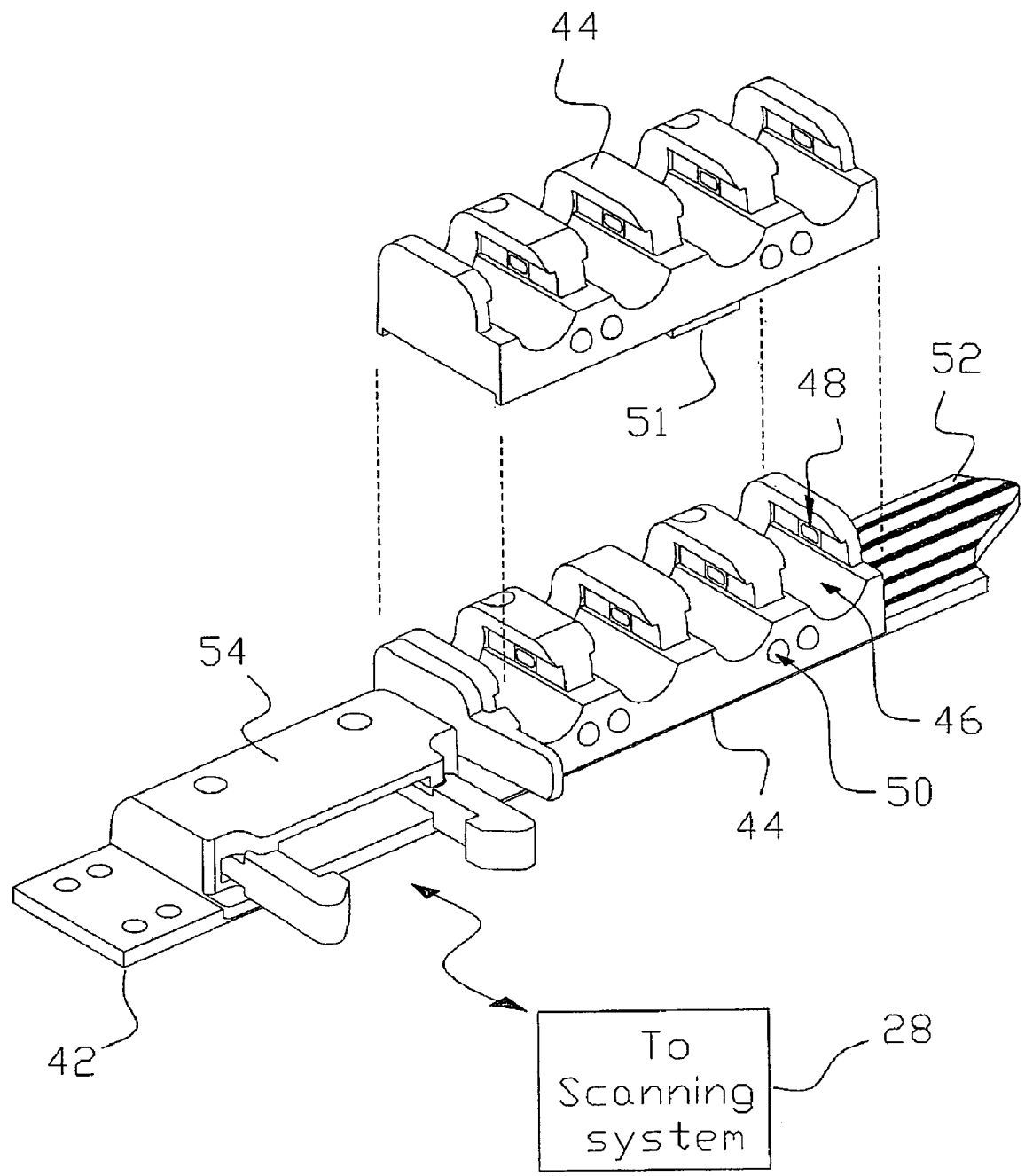
FIG. 2 is an exemplary illustration of a connectivity apparatus according to embodiments of the present invention.

Reference is now made to FIG. 2, which describes an exemplary connectivity apparatus according to embodiments of the present invention. Connectivity apparatus 40 may comprise a mother board 42 and one or more modules 44 connectable, mechanically and electrically to mother board 42. The number and position of modules assembled to the mother board are determined according to the design of the target device as explained in details below. The modules may be easily assembled to the mother board using any known suitable connection means. Likewise, a module may be easily removed from the board, if needed.

Figure 4:
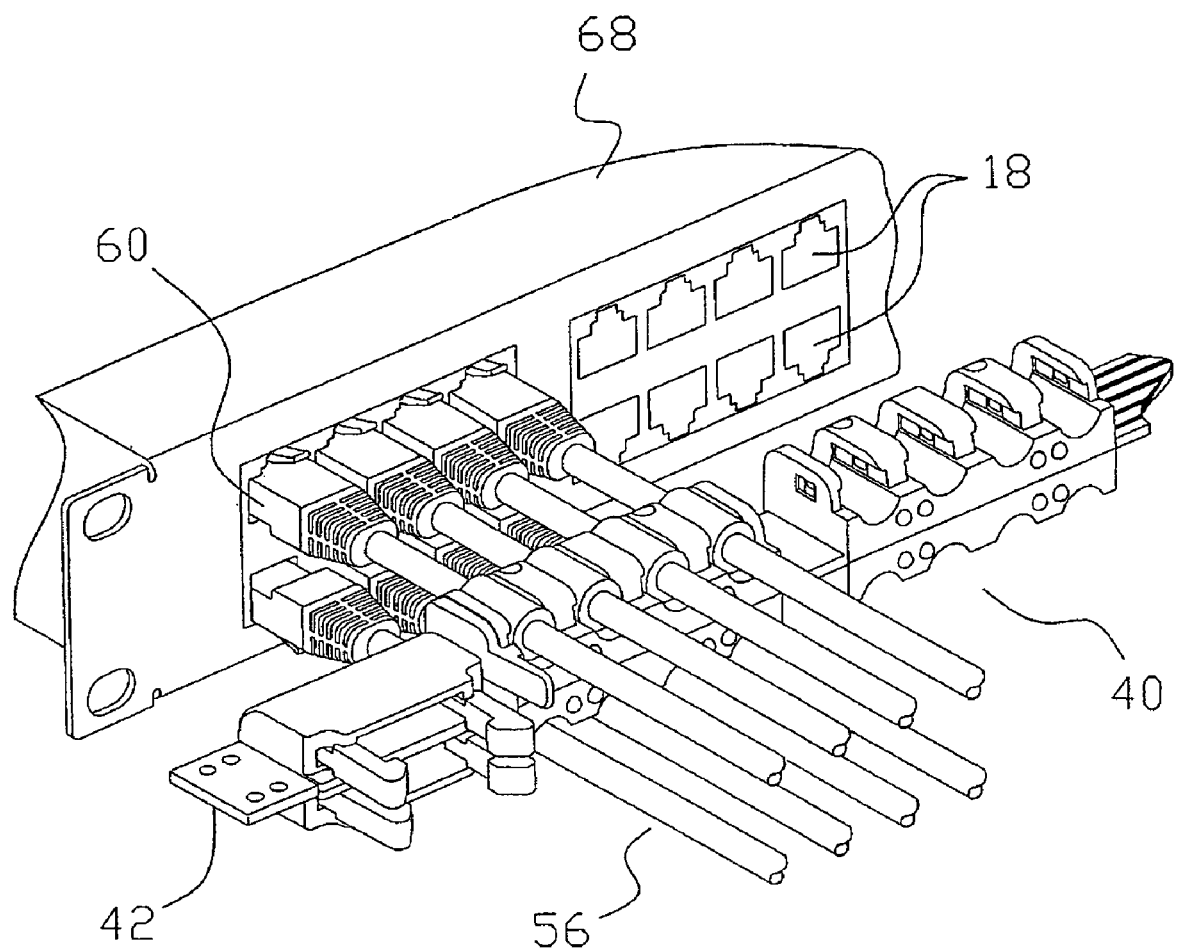
FIG. 4 is an exemplary pictorial illustration of high density patch panel having standard sockets assembled with the connectivity apparatus according to embodiments of the present invention.

According to embodiments of the present invention, modules 44 may be assembled to both surfaces of mother board 44 as demonstrated in FIG. 4. This configuration may be useful for a high density panel having standard sockets. The term "high density panels" may refer to panels having two rows of ports in within a rack space height of 1U. The unit height, one standard Unit (1U) is defined according to standard of the industry, such as the EIA RS 310-C Standard (November 1977).

According to embodiments of the present invention, module 44 may comprise a printed circuit board (PCB) with control signal interface. Module 44 may be structurally configured with slots 46, which may be used as cradles to insert patch cords therein. The number of slots may be determined based on the physical characteristics of the intended target device. In the exemplary illustration of FIG. 2, a structure of four slots per module is shown. The four-slot configuration may be used for a large variety of LAN equipment devices. It should be understood however that modules comprising a different number of slots may be used as required for other equipment devices.

Module 44 may comprise within slot 46 a signal-terminal 48. According to embodiments of the present invention, signal-terminal 48 may be an electrically conductive contact, such as a metal contact. Even though usually the contacts are metal contacts, it should be understood to a person skilled in the art that other electrically conductive materials may be used. According to other embodiments of the present invention, signal-terminal may be a sensor having a self identification capability, such as for example an ID-chip. Throughout the specification and the claims, signal-terminal 48 is referred to as a "slot signal-terminal".

Upon installation, the slots are positioned such that individual signal-terminal 48 are substantially aligned with corresponding sockets at the target device and signals received from a particular signal-terminal are indicative of the connectivity status of its respective socket.

According to embodiments of the present invention, module 44 may comprise light sources, such as light emitting diodes (LED's) 50 for connectivity indication. Each LED 50 may be positioned in proximity to a corresponding signal-terminal 48 and accordingly may be associated with a particular socket. LED 50 may be activated upon receiving commands from a central management unit (not shown).

Module 44 may further comprise an electrical board-to-board connector 51 to electrically connect signal-terminals 48 to mother board 42. Mother board 42 may be a printed circuit board having uncoated electrical bus lines 52 terminated at a connector 54. Connecter 54 may be coupled to scanning system 28 to enable transmission of signals from scanning system 28 to signal-terminals 48.

Figure 3:
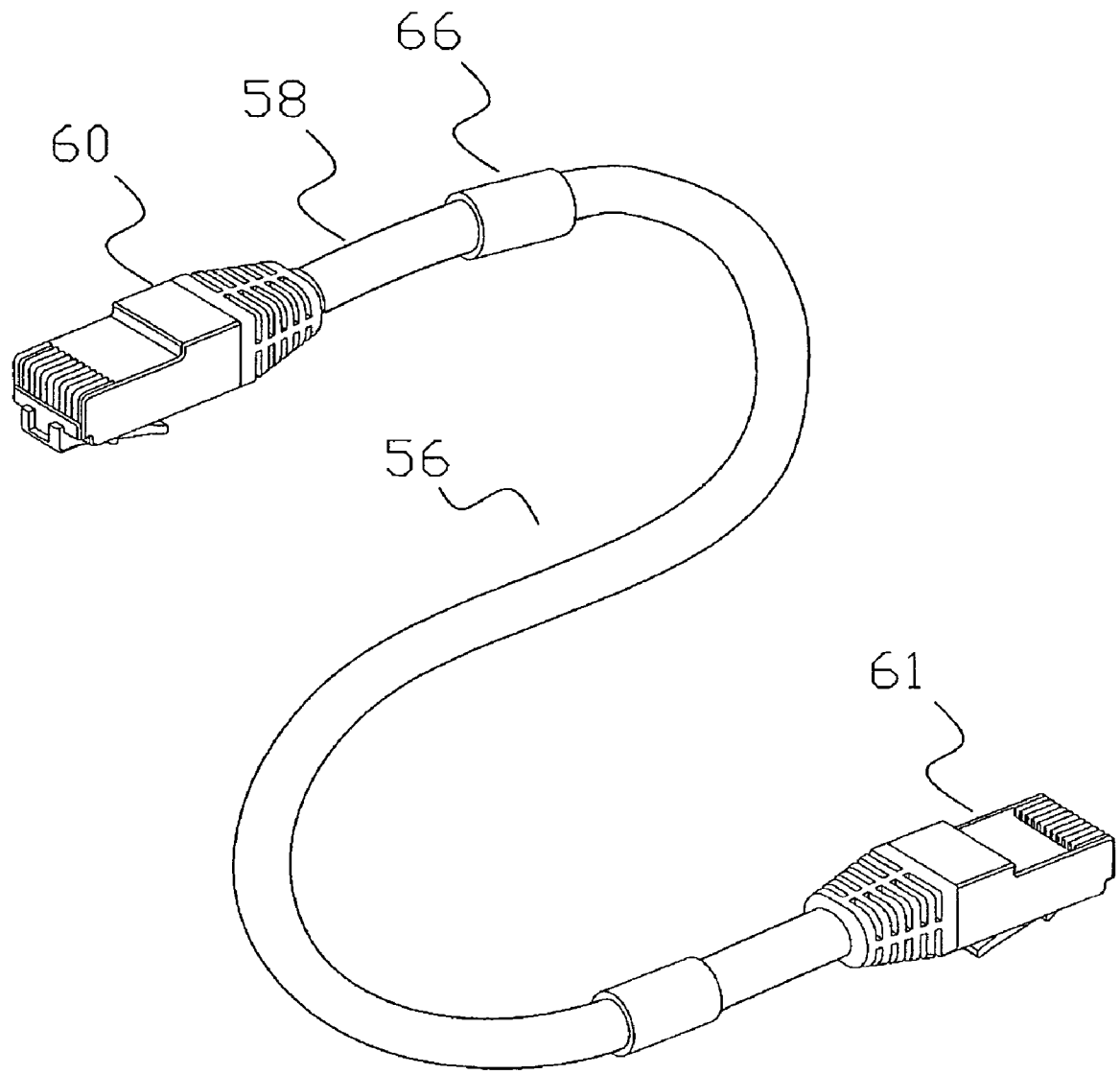
FIG. 3 is pictorial illustration of an exemplary cable according to some embodiments of the present invention.

Reference is now made to FIG. 3, which is an exemplary illustration of a patch cord according to embodiments of the present invention. A patch cord 56 may comprise a cable 58 and a standard plug 60. Patch cord 56 may further comprise another plug 61 attached to the other end of the cable which may be either a standard plug or a smart plug having an internal scanning contact.

Cable 58 may be any suitable cable known in the art, such as, for example, a copper cable or a fiber optic cable. Patch cord 56 may comprise a signal-terminal 66. According to embodiments of the present invention, signal-terminal 66 may be an electrically conductive contact, such as a metal contact. Even though usually the contacts are metal contacts, it should be understood to a person skilled in the art that other electrically conductive materials may be used. According to other embodiments of the present invention, signal-terminal may be a sensor having a self identification capability, such as for example an ID-chip.

In the exemplary embodiment illustrated in FIG. 3 and described below, signal-terminal 66 is illustrated as an electrically conductive contact 66. Contact 66 may be structurally designed to be in physical contact with a particular slot signal terminal 22 or 26 when the cable is inserted into the respective slot. Although usually, the conductive contacts are metal contacts, it should be understood to a person skilled in the art that other electrically conductive materials may be used.

Signal-terminal 66 may be attached to the external surface of the cable at a certain distance from plug 60 for the scanning operation. Throughout the specification and the claims, signal-terminal 66 is referred to as a "cable signal-terminal".

Cable signal-terminal 66 may be in a shape of a ring surrounding cable 58 to ease the insertion of the cable to the slot of module 44. Although, in the exemplary illustration of FIG.

3, a shape of a ring is shown, it should be understood to a person skilled in the art that cable signal-terminal 66 may be in any other suitable shape.

Due to the detached location of cable signal-terminal 66 relative to plug 60, board 42 may be positioned to be physically isolated from the sockets of the target device. Accordingly, it may reduce the level of precision required when positioning the connectivity apparatus opposite the target device.

According to embodiments of the present invention, patch cord 56 may further comprise a dedicated scanning wire within cable 58. The scanning wire may be electrically coupled to cable signal-terminal 66 on one end and to a similar cable signal-terminal (not shown) on the other end, Alternatively, the scanning wire may be coupled on the other end of cable 58 to an internal scanning contact of a smart plug.

Reference is now made to FIG. 4, which is an exemplary illustration of a high density patch panel having ordinary sockets assembled with the connectivity apparatus according to embodiments of the present invention. Before the installation of connectivity apparatus 40 to a high density target device 68, the specific configuration of the assembly should be determined. Accordingly, the number, shape and position of modules 44 is determined based on the configuration of target device 68. Then, the modules may be assembled to board 42 such that upon positioning the board opposite the target device at least a portion of the slots of the modules may be substantially aligned with corresponding sockets 18.

Patch cords 56 having ordinary plugs 58 may be inserted into some of the slots as required such that cable signal-terminal 66 may be coupled to slot signal-terminal 48 to enable the scanning operation. As required, plugs 60 may be inserted to corresponding sockets 18. As can be seen in FIG. 4, the connectivity apparatus may be regarded as "floating", namely, there may be no need for any mechanical assembly between the apparatus and the target device as the patch cords support the connectivity apparatus. Therefore, the connectivity apparatus according to embodiments of the present invention may be fitted to a large variety of target devices that may contain either vertically or horizontally distributed ports. It should be noted that in the initialization phase, two non-active patch cords may be used to hold the connectivity apparatus.

According to other embodiments of the present invention the connectivity apparatus may be mechanically assembled to the target device using any suitable connection means. It should be noted that in these embodiments the gap between board 42 and the socket at the frontal surface of the target device remains and the physical connection may be made to other parts of the target device.

After the installation, scanning system may forward a scanning signal to a first cable signal-terminal 66 via slot signal-terminal 48. Then, if a connectivity path from the first cable signal-terminal to a second cable signal-terminal associated with another socket exists, according to the signal received at the scanning system, the system may determine the connectivity status for this pair. Alternatively, the system may determine that this port is not connected. By repeating this process for all the sockets the connectivity map of the system may be determined.

It is appreciated that one or more of the operations of the assembly method described herein may be omitted or carried out in a different order than that shown, without departing from the true spirit and scope of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. An apparatus comprising:
   a board positionable opposite a frontal surface of a target device, the frontal surface having sockets of communication ports, said board having a plurality of bus lines being coupled to a scanning system;
   a module with one or more slots, each slot has a slot signal-terminal, said module connectable to the board such that at least some of said slots would be substantially aligned with respective sockets of the target device; and
   a multiconductive cable having at least one cable signal-terminal attached to an external surface of said cable,
   wherein when a first plug attached to said cable at one end is inserted into a particular socket and said cable signal-terminal is inserted into a corresponding slot, transmission of signals between the scanning system and the cable signal-terminal is enabled.

2. The apparatus of claim 1, wherein said slot signal-terminal and said metal signal-terminal comprises an electrically conductive contact.

3. The apparatus of claim 1, wherein said slot signal-terminal and said metal signal-terminal comprises sensors having self identification capability.

4. The apparatus of claim 1, wherein said signals being indicative of interconnection of said sockets.

5. The apparatus of claim 1 further comprising additional modules connectable to said board.

6. The apparatus of claim 5, wherein said modules are connectable to said board from both sides of said board.

7. The apparatus of claim 1, wherein said module comprises a board-to-board connector to provide electrical connection to said board.

8. The device of claim 1, wherein said module comprises connectivity indicators, each indicator associated with one of said slots.

9. The device of claim 1, wherein said board is being carried by said multiconductor cable and an additional cable when said cables are inserted into sockets of said target device.

10. The apparatus of claim 1, wherein said cable comprises a dedicated scanning wire coupled to the cable signal-terminal at one end of said cable and to a second plug at another end of said cable.

11. The apparatus of claim 1, wherein said cable comprises a dedicated scanning wire coupled to said cable signal-terminal at one end of said cable and to another cable signal-terminal at another end of said cable.

12. A method comprising:
   connecting, physically and electrically, to a board one or more modules having one or more slots, each slot has an electrically conductive slot-contact;
   positioning said board opposite a target device having a frontal surface with sockets of communication ports such that at least some of said slots are substantially aligned with corresponding sockets of the target device;
   inserting a plug of a multiconductor cable into a socket, said cable having an external electrically conductive cable-contact positioned separated from said plug;
   inserting said cable-contact into a slot positioned substantially aligned with said socket; and
   connecting said board via bus lines to a scanning unit such that transmission of signals between the scanning system and said cable-contact is enabled.

* * * * *